United States Patent
Rudolph et al.

(10) Patent No.: US 12,397,380 B2
(45) Date of Patent: Aug. 26, 2025

(54) LOW MELTING TEMPERATURE FLUX MATERIALS FOR BRAZING APPLICATIONS AND METHODS OF BRAZING USING THE SAME

(71) Applicant: HONEYWELL INTERNATIONAL INC., Charlotte, NC (US)

(72) Inventors: Jürgen Friederich Rudolph, Peine (DE); Moritz Karl Rosenthal, Walsrode (DE)

(73) Assignee: Honeywell International Inc., Charlotte, NC (US)

( * ) Notice: Subject to any disclaimer, the term of this patent is extended or adjusted under 35 U.S.C. 154(b) by 248 days.

(21) Appl. No.: 17/813,610

(22) Filed: Jul. 20, 2022

(65) Prior Publication Data

US 2023/0041004 A1 Feb. 9, 2023

Related U.S. Application Data

(60) Provisional application No. 63/203,674, filed on Jul. 28, 2021.

(51) Int. Cl.
| | |
|---|---|
| *B23K 35/362* | (2006.01) |
| *B23K 35/28* | (2006.01) |
| *B23K 35/36* | (2006.01) |
| *C22C 18/04* | (2006.01) |
| *B23K 103/10* | (2006.01) |

(52) U.S. Cl.
CPC .......... *B23K 35/362* (2013.01); *B23K 35/282* (2013.01); *B23K 35/3605* (2013.01); *B23K 35/3606* (2013.01); *C22C 18/04* (2013.01); *B23K 2103/10* (2018.08)

(58) Field of Classification Search
CPC .................................................... B23K 35/362
See application file for complete search history.

(56) References Cited

U.S. PATENT DOCUMENTS

| | | | |
|---|---|---|---|
| 5,171,377 A | 12/1992 | Shimizu et al. | |
| 6,432,221 B1 * | 8/2002 | Seseke-Koyro | ... B23K 35/3605 148/26 |
| 2007/0187462 A1 * | 8/2007 | Wittebrood | ............... C22F 1/04 228/101 |
| 2013/0082089 A1 | 4/2013 | Gallagher et al. | |
| 2018/0369967 A1 | 12/2018 | Memmel et al. | |
| 2020/0114476 A1 * | 4/2020 | Yoo | ...................... B23K 35/362 |

FOREIGN PATENT DOCUMENTS

| | | |
|---|---|---|
| CN | 107030412 A | 8/2017 |
| CN | 111633355 A | 9/2020 |
| JP | H091390 A | 1/1997 |
| JP | 2014237145 A | 12/2014 |
| WO | 2018236980 A1 | 12/2018 |

OTHER PUBLICATIONS

PCT International Search Report and Written Opinion Based on PCT Application No. PCT/US2022/074063.

* cited by examiner

*Primary Examiner* — Jophy S. Koshy

(74) *Attorney, Agent, or Firm* — Ingrassia, Fisher & Lorenz | IF&L

(57) ABSTRACT

Low melting temperature flux materials for brazing applications and methods of brazing using the same are provided. A low melting temperature flux material for brazing applications includes as a majority constituent, a Cs-containing flux material, as a first minority constituent, a eutectic blend composition, and, optionally, as a second minority constituent, a mediating compound. The second minority constituent is present in the low melting temperature flux material in a lesser amount with respect to the first minority constituent.

13 Claims, No Drawings

LOW MELTING TEMPERATURE FLUX MATERIALS FOR BRAZING APPLICATIONS AND METHODS OF BRAZING USING THE SAME

CROSS-REFERENCE TO RELATED APPLICATION

This application claims the benefit of U.S. Provisional Application No. 63/203,674, filed Jul. 28, 2021, which is hereby incorporated in its entirety by reference.

TECHNICAL FIELD

The present disclosure generally relates to materials useful for brazing applications and associated brazing methods. More particularly, the present disclosure relates to low melting temperature flux materials for brazing applications and methods of brazing using the same.

BACKGROUND

Brazing is a metal-joining process in which two or more metal articles are joined together by melting and flowing a braze material, which may be a metal or a metal alloy, into a joint that is defined between the metal articles. More specifically, brazing is a thermally induced metallic bonding process that occurs below the melting point of the metals to be joined with the introduction between them in the joint of the braze material, which has a lower melting point than the metals to be joined. Upon subsequent cooling, the braze material forms a fillet that bonds the metal articles together at faying surfaces thereof. For assured selective melting of only the braze material during heating, the melting point of the braze material is typically chosen to be lower than that of the metal in the metal articles to be joined. For brazing aluminum articles together, for example, a suitable brazing alloy is an aluminum-silicon (Al—Si) or an aluminum-zinc (Al—Zn) eutectic composition.

The brazing process involves a number of metallurgical and chemical processes that take place both on the surface and within the materials. For example, good wetting and spreading of the molten braze material on the surface of the metal articles determine whether capillary action will occur. Capillary flow is the dominant physical principle that ensures an acceptable braze fillet in a properly spaced joint, provided molten braze material wets both surfaces that are to be joined. Capillary flow is affected by the presence of oxide films, surface roughness, and the condition and properties of the brazing atmosphere.

Various techniques are employed to apply the braze material to the metal articles to be brazed. In one such technique, at least one of the surfaces being joined is pre-clad with a layer of aluminum brazing alloy. Such pre-clad articles, generally known as brazing sheet, are relatively costly, and in many instances, it is preferred to provide the braze material in some form other than cladding. One known alternative is to apply the braze material to or adjacent to one or both joining surfaces in powdered or particulate form carried in a suitable liquid or paste-like vehicle. In such methods, a mixture of the braze material in powdered form, in an aqueous carrier or mixed with a binder, is coated on the surfaces to be joined. When included in an aqueous carrier, the coating is then dried, and the surfaces are then heated to a brazing temperature whereby the brazing is completed. When included with a binder, e.g., a polymeric material that binds the braze material to the surfaces of the article to be brazed, the binder is generally burned off prior to brazing through pre-heating of the article after deposition of the coating thereon.

Brazing of some metal articles, such as aluminum and its alloys, is particularly difficult because an oxide film forms on the surface when exposed to air. The barrier action of the oxide film on aluminum hinders wetting and inhibits capillary flow. To enable intimate contact between the molten braze material and the base metal of the article, it is necessary to disrupt the oxide, for example through the use of an inorganic salt that acts as a flux. An inert brazing atmosphere free from oxygen and water vapor may be facilitated to prevent re-oxidation of the molten braze material and oxidation of the flux itself. This may be achieved by brazing under nitrogen or by using a vacuum. The flux should be capable of disrupting and/or otherwise removing the metal oxides at the brazing temperatures while remaining essentially inert with respect to the metal of the article, e.g., aluminum, at the brazing temperatures. Since fluxes are usually reactive only when at least partially molten, fluxes for aluminum brazing, for example, should be molten at brazing temperatures. Flux materials heretofore commercially employed in brazing aluminum have commonly been mixtures of predominantly chloride salts, with minor additives of fluoride in some cases.

Due to their lack of a plastic phase and relatively low melting temperature, Al—Zn brazing materials that are zinc rich are desirable for brazing aluminum components together. These brazing materials include (by mol percentage) 98Zn/2Al, 95Zn/5Al, 90Zn/10Al, and 85Zn/15Al, for example. These brazing materials offer excellent wettability of aluminum, good strength, and corrosion resistance. Currently available flux materials, however, are not suitable for use in connection with these low melting temperature Al—Zn brazing materials due to their relatively high melting points or their inclusion of corrosive salts, such as zinc chloride ($ZnCl_2$) or ammonium chloride ($NH_4Cl$).

It is therefore desirable to provide new flux materials suitable for use with low melting temperature Al—Zn brazing materials. These new flux materials would desirable have melting points below the Al—Zn brazing materials and would not include any corrosive salts. Additionally, it would be desirable to provide methods for brazing using such new flux materials. Furthermore, other desirable features and characteristics of the inventive subject matter will become apparent from the subsequent detailed description of the inventive subject matter and the appended claims, taken in conjunction with this background of the inventive subject matter.

BRIEF SUMMARY

In an exemplary embodiment, disclosed is a low melting temperature flux material for brazing applications that includes (comprises or consists of) as a majority constituent, a cesium-containing (Cs-containing) flux material, as a first minority constituent, a eutectic blend composition, and, optionally, as a second minority constituent, a mediating compound. The second minority constituent is present in the low melting temperature flux material in a lesser amount with respect to the first minority constituent.

In another exemplary embodiment, disclosed is a low melting temperature flux material for brazing applications that includes (comprises or consists of) as a majority constituent, a Cs-containing flux material. The Cs-containing flux material includes a cesium-aluminum-fluorine flux material. The low melting temperature flux material further includes as a first minority constituent, a eutectic blend composition. The eutectic blend composition includes a sodium tetrafluoroborate/sodium fluoride eutectic blend composition. Still further, the low melting temperature flux material includes as a second minority constituent, a mediating compound. The mediating compound includes zinc oxide. The second minority constituent is present in the low melting temperature flux material in a lesser amount with respect to the first minority constituent. Additionally, the low melting temperature flux material is in the form of a powder or a paste.

In yet another exemplary embodiment, disclosed is a method of brazing using a low melting temperature flux material that includes providing or obtaining two metallic substrates, providing or obtaining a brazing material, and providing or obtaining the low melting temperature flux material. The low melting temperature flux material includes as a majority constituent, a Cs-containing flux material, as a first minority constituent, a eutectic blend composition, and, as a second minority constituent, a mediating compound. The second minority constituent is present in the low melting temperature flux material in a lesser amount with respect to the first minority constituent. The method further includes applying the brazing material and the low melting temperature flux material to a joint area of one of the two metallic substrates, bringing together in contact at the joint area the two metallic substrates, heating the joint area to a temperature above a melting temperature of the brazing material and above a melting temperature of the low melting temperature flux material, but below a melting temperature of the two metallic substrates, and allowing the joint area to cool below the melting temperature of the brazing material and below the melting temperature of the low melting temperature flux material.

This brief summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

DETAILED DESCRIPTION

The following detailed description of the invention is merely exemplary in nature and is not intended to limit the invention or the application and uses of the invention. Furthermore, there is no intention to be bound by any theory presented in the preceding background of the invention or the following detailed description of the invention.

As used herein, "a," "an," or "the" means one or more unless otherwise specified. The term "or" can be conjunctive or disjunctive. The term "about" as used in connection with a numerical value throughout the specification and the claims denotes an interval of accuracy, familiar and acceptable to a person skilled in the art. In general, such interval of accuracy is ±ten percent. Thus, "about ten" means nine to eleven. All numbers in this description indicating amounts, ratios of materials, physical properties of materials, and/or use are to be understood as modified by the word "about," except as otherwise explicitly indicated. As used herein, the "%" described in the present disclosure refers to the mol percentage unless otherwise indicated.

Embodiments of the present disclosure are broadly directed to non-corrosive, low melting temperature flux materials for brazing applications and methods of brazing using the same. The flux materials described herein include cesium (Cs) and various additional compounds and allow the aforementioned low melting temperature Al—Zn brazing materials, whose melting points are in the range of about 385° C. to about 420° C., to be bonded to aluminum. The flux materials of the present disclosure are based known Cs-containing flux materials, such as $CsAlF_4$ (melting point 435° C.). In order to lower the melting point of these Cs-containing flux materials to a suitable range compatible with the low melting temperature Al—Zn brazing materials, the inventors herein have surprisingly discovered that it is possible to add small amounts of a low-melting eutectic blend composition, along with an optional mediating compound for compatibility between the brazing material and the aluminum substrates, to lower the melting point of the Cs-containing flux materials below 400° C. Beneficially, neither the eutectic blend composition nor the mediating compound include any corrosive elements, such as Cl. Various embodiments of the present disclosure are described hereinafter.

Cs-Containing Flux Materials

As initially noted, the low melting temperature flux materials of the present disclosure include Cs-containing flux materials as the primary constituent. Such flux materials may be provided as a composition further including aluminum (Al) and fluorine (F) (i.e., a cesium-aluminum-fluorine flux material). An exemplary composition includes cesium, aluminum, and fluorine, and optionally water. Such a composition may have a selected aluminum:cesium:fluorine molar ratio. For example, the aluminum:cesium:fluorine molar ratio may be about (1):(1-1.5):(3.5-4.5). In certain embodiments, the aluminum:cesium:fluorine molar ratio may be about (1):(1.1-1.2):(4.0-4.2), such as about (1):(1.15-1.20):(4.10-4.15).

On the basis of mass percentages, an exemplary composition may be formed containing from about 6 to about 12 mass percent aluminum, based on the total mass of the composition. More particularly, an exemplary composition may be formed containing from about 9 to about 10 mass percent aluminum, based on the total mass of the composition. Further, an exemplary composition may be formed containing from about 50 to about 70 mass percent cesium, based on the total mass of the composition. More particularly, an exemplary composition may be formed containing about 58 to about 61 mass percent cesium, based on the total mass of the composition. Also, the exemplary composition may be formed containing from about 20 to about 40 mass percent fluorine, based on the total mass of the composition. More particularly, an exemplary composition may be formed containing from about 29 to 31 mass percent fluorine, based on the total mass of the composition.

In certain embodiments, an exemplary Cs-containing flux material may be formed with a composition of hydrated cesium tetrafluoroaluminate ($CsAlF_4$ $(H_2O)_2$). In other embodiments, an exemplary Cs-containing flux material may be formed with a composition of hydrated cesium pentafluoroaluminate ($Cs_2AlF_5$ $(H_2O)_2$). In further embodiments, an exemplary Cs-containing flux material may be formed with a composition of (hexagonal) cesium tetrafluoroaluminate ($CsAlF_4$).

The Cs-containing flux material may be formed by combining aluminum oxide ($Al_2O_3$) and hydrofluoric acid (HF) to form tetrafluoroaluminic acid ($HAlF_4$). Thereafter, cesium hydroxide (CsOH) is mixed with the tetrafluoroaluminic acid. The pH of this mixture may then be increase to a range from about 4.5 to about 9, such a from about 7 to about 8. The mixture may then be pre-treated before undergoing spray drying. For example, the mixture may be cooled down to a temperature of from about 30° C. to about 50° C., such as to a temperature of about 40° C. Furthermore, the cooled mixture may be delivered to a spray drying unit wherein the mixture may be atomized through contact with a pressurized gas stream flowing from a compressor to an atomizer, for example rotary discs.

The mixture and pressurized gas stream pass through the atomizer into a drying chamber at a selected inlet temperature. For example, the inlet temperature may be higher than about 200° C., such as from about 200° C. to about 400° C., or about 220° C. to about 300° C. Passing through the atomizer at the selected inlet temperature causes formation of the Cs-containing flux material in the form of dried particulate or powder. A stream of the dried particulate and gas may pass out of the drying chamber at a temperature from about 80° C. to about 150° C., such as from about 90° C. to about 125° C.

As initially noted, the Cs-containing flux material may be the majority constituent of the low melting temperature flux materials of the present disclosure. As such, in an embodiment, the Cs-containing flux material may be present in the low melting temperature flux material, on a molar basis, in a range from about 80% to about 90%. In a particular embodiment, the Cs-containing flux material may be present in the low melting temperature flux material, on a molar basis, in a range from about 82% to about 88%. Furthermore, in an embodiment, the Cs-containing flux material may be present in the low melting temperature flux material, on a molar basis, at about 85%.

Low-Melting Eutectic Blend Composition

As initially noted, it is possible to add to the Cs-containing flux material described above a minority amount of a low-melting eutectic blend composition in order to lower the melting temperature of the low melting temperature flux materials of the present disclosure. The low-melting eutectic blend composition should be physically and chemically compatible with the Cs-containing flux material in order to achieve sufficient wetting of the substrate surface and to prevent the formation of oxides thereon. Accordingly, the inventors herein have discovered that a sodium tetrafluoroborate/sodium fluoride ($NaBF_4$/NaF) eutectic blend composition meets the aforementioned criteria.

Sodium tetrafluoroborate is an inorganic salt in the form of colorless or white water-soluble rhombic crystals. Similarly, sodium fluoride is an inorganic salt in the form of colorless or white water-soluble cubic crystals. At a particular relative ratio of sodium tetrafluoroborate to sodium fluoride, a eutectic blend composition may be achieved. For example, a suitable relative ratio of sodium tetrafluoroborate to sodium fluoride may be, on a molar basis, from about 88:12 to about 92:8, such as from about 89:11 to about 91:9, and in an embodiment about 90:10. This eutectic blend composition melts at a temperature of about 383° C. to about 385° C., such as about 384° C., which is within the desired melting range for use in connection with the above-described Al—Zn brazing materials.

The sodium tetrafluoroborate/sodium fluoride eutectic blend composition may be added to the Cs-containing flux material in a minority amount in order to lower the melting temperature of the low melting temperature flux material below 400° C. such that the low melting temperature flux material will be compatible for use with the above-described Al—Zn brazing materials. As such, in an embodiment, the sodium tetrafluoroborate/sodium fluoride eutectic blend composition may be present in the low melting temperature flux material, on a molar basis, in a range from about 7% to about 13%. In a particular embodiment, the sodium tetrafluoroborate/sodium fluoride eutectic blend composition may be present in the low melting temperature flux material, on a molar basis, in a range from about 9% to about 11%. Furthermore, in an embodiment, the Cs-containing flux material may be present in the low melting temperature flux material, on a molar basis, at about 10%.

Mediating Compound

As initially noted above, for purposes of compatibility between the brazing material and the aluminum substrates, it has been found desirable to add a minority constituent of a mediating compound to the low melting temperature flux materials of the present disclosure. The mediating compound is an optional component. The amount of the mediating compound present in the low melting temperature flux materials may be less than the amount of the sodium tetrafluoroborate/sodium fluoride eutectic blend composition present. In an embodiment, the mediating compound may be zinc oxide (ZnO). Zinc oxide is an inorganic compound in the form of a white powder. Due to the relatively high amount of zinc in the above-described Al—Zn brazing materials, zinc oxide serves as a suitable mediating compound with the aluminum substrates.

As such, in an embodiment, the zinc oxide mediating compound may be present in the low melting temperature flux material, on a molar basis, in a range from about 0% to about 7%, or in a range from about 3% to about 7%. In a particular embodiment, the zinc oxide mediating compound may be present in the low melting temperature flux material, on a molar basis, in a range from about 4% to about 6%. Furthermore, in an embodiment, the zinc oxide mediating compound may be present in the low melting temperature flux material, on a molar basis, at about 5%.

TABLE 1, below, provides minimum, maximum, and exemplary compositional ranges for low melting temperature flux materials in accordance with some embodiments the present disclosure (all values in TABLE 1 being in mol-%).

TABLE 1

| Component | Minimum | Maximum | Exemplary |
| --- | --- | --- | --- |
| Cs-Containing Flux | 80 | 90 | 85 |
| Eutectic Blend | 7 | 13 | 10 |
| Mediating Compound | 0 | 7 | 5 |

The low melting temperature flux material may be prepared by mixing together the powder forms of each of the Cs-containing flux material, the sodium tetrafluoroborate/sodium fluoride eutectic blend composition, and the zinc oxide mediating compound, thereby providing the low melting temperature flux material in powder form. In an alternative embodiment, the low melting temperature flux material may be provided in the form of a paste by adding to the aforementioned powder form a high boiling glycol blend, a rheology additive (thickener), and/or a UV-marker. High boiling point glycol blends may include polyethylene glycols, polypropylene glycols, glycol resins such as polyoxyalkylene ethers, alkyl alcohols, and water (various formulations thereof are known in the art and art commercially available). Rheology additives include any of a variety of compounds that allow a paste to display non-Newtonian properties. Further, UV-markers include any of a variety of compounds that become visible under ultraviolet (UV) light.

Brazing Method

Embodiments of the present disclosure further relate to methods of brazing using Al—Zn brazing materials and low melting temperature flux materials as described above. As an initial step, a low melting temperature flux material is prepared. In general, the low melting temperature flux material may have a composition, on a molar basis, of a majority of the Cs-containing flux material, a minority of the sodium tetrafluoroborate/sodium fluoride eutectic blend composition, and a minority of the zinc oxide mediating compound, wherein the amount of the zinc oxide mediating compound present is less than the amount of the sodium tetrafluoroborate/sodium fluoride eutectic blend composition present. In an embodiment, the low melting temperature flux material may have a composition, on a molar basis, of about 80% to about 90% of the Cs-containing flux material, about 7% to about 13% of the sodium tetrafluoroborate/sodium fluoride eutectic blend composition, and about 0% to about 7%, or about 3% to about 7%, of the zinc oxide mediating compound. In a further embodiment, the low melting temperature flux material may have a composition, on a molar basis, of about 82% to about 88% of the Cs-containing flux material, about 9% to about 11% of the sodium tetrafluoroborate/sodium fluoride eutectic blend composition, and about 4% to about 6% of the zinc oxide mediating compound. In yet a further embodiment, the low melting temperature flux material may have a composition, on a molar basis, of about 85% of the Cs-containing flux material, about 10% of the sodium tetrafluoroborate/sodium fluoride eutectic blend composition, and about 5% of the zinc oxide mediating compound. Furthermore, in the initial step, an Al—Zn brazing material is obtained. The Al—Zn brazing material may be, on a molar basis, any of 98Zn/2Al, 95Zn/5Al, 90Zn/10Al, or 85Zn/15Al. In a particular embodiment, the Al—Zn brazing material is 98Zn/2Al. Still further, in the initial step, two metallic substrates, which are to be brazed together, are obtained. In an embodiment, the metallic substrates may be formed of aluminum or an aluminum alloy.

Thereafter, the brazing method proceeds with the application of an amount of both the Al—Zn brazing material and the low melting temperature flux material to the joint area of one of the two metallic substrates. Subsequent to application, the two metallic substrates are brought together in contact at the joint area, and the joint area is heated to a temperature slightly above the melting temperature of each of the Al—Zn brazing material and the low melting temperature flux material, but below the melting temperature of the metallic substrates. In this manner, the Al—Zn brazing material flows into the joint area by capillary action. It then flows over the metallic substrates in a process known as wetting. Thereafter, the joint area is cooled below the melting temperatures of each of the brazing material and the low melting temperature flux material to complete the brazing method, resulting in the metallic substrates being brazed/joined together in a rigid manner.

Accordingly, the present disclosure has provided non-corrosive, low melting temperature flux materials for brazing applications and methods of brazing using the same. The flux materials described herein include cesium (Cs) and various additional compounds and allow the aforementioned low melting temperature Al—Zn brazing materials, whose melting points are in the range of about 385° C. to about 420° C., to be bonded to aluminum. Beneficially, the disclosed low melting temperature flux materials do not include any corrosive salts, such as zinc chloride or ammonium chloride.

While at least one exemplary embodiment has been presented in the foregoing detailed description of the inventive subject matter, it should be appreciated that a vast number of variations exist. It should also be appreciated that the exemplary embodiment or exemplary embodiments are only examples, and are not intended to limit the scope, applicability, or configuration of the inventive subject matter in any way. Rather, the foregoing detailed description will provide those skilled in the art with a convenient road map for implementing an exemplary embodiment of the inventive subject matter. It being understood that various changes may be made in the function and arrangement of elements described in an exemplary embodiment without departing from the scope of the inventive subject matter as set forth in the appended claims.

What is claimed is:

1. A flux composition for brazing applications comprising:
   a cesium (Cs)-containing flux material in an amount of from 80 mol-% to 90 mol-% of the total flux composition; and
   a eutectic blend composition including sodium tetrafluoroborate and sodium fluoride, wherein the eutectic blend composition is in an amount of 7 mol-% to 13 mol-% of the total flux composition; and wherein the molar ratio of sodium tetrafluoroborate to sodium fluoride is from 88:12 to 92:8.

2. The flux composition of claim 1, further comprising a mediating compound, wherein the mediating compound is present in the flux composition in a lesser amount with respect to the eutectic blend composition.

3. The flux composition of claim 2, wherein the mediating compound is zinc oxide.

4. The flux composition of claim 2, wherein the mediating compound is present in an amount of 3 mol-% to 7 mol-% of the total flux composition.

5. The use flux composition of claim 3, wherein the flux composition is in the form of a powder or a paste.

6. The flux composition of claim 4, wherein the mediating compound is zinc oxide.

7. A method of brazing using the flux composition according to claim 1 comprising:
   providing or obtaining two metallic substrates;
   providing or obtaining a brazing material;
   providing or obtaining the flux composition,
   applying the brazing material and the flux composition to a joint area of one of the two metallic substrates;
   bringing together in contact at the joint area the two metallic substrates;
   heating the joint area to a temperature above a melting temperature of the brazing material and above a melting temperature of the flux composition, but below a melting temperature of the two metallic substrates; and
   allowing the joint area to cool below the melting temperature of the brazing material and below the melting temperature of the flux composition.

8. The method of claim 7, wherein the brazing material comprises an aluminum-zinc material.

9. The method of claim 8, wherein the aluminum zinc material comprises a 98Zn/2Al material.

10. The method of claim 7, wherein the two metallic substrates comprise an aluminum material or an aluminum alloy material.

11. The method of claim 7, wherein the flux composition is in the form of a powder or a paste.

12. The method of claim 7, wherein the flux composition further comprises zinc oxide as a mediating compound in an amount of 3 mol-% to 7 mol-% of the total flux composition.

13. The method of claim 12, wherein the Cs-containing flux material comprises a cesium-aluminum-fluorine flux material.

\* \* \* \* \*